United States Patent
Girondi

(10) Patent No.: US 11,988,120 B2
(45) Date of Patent: May 21, 2024

(54) BLOW-BY GAS FILTRATION ASSEMBLY WITH THREADED FILTER PORTION

(71) Applicant: UFI FILTERS S.P.A., Mantova (IT)

(72) Inventor: Giorgio Girondi, Mantova (IT)

(73) Assignee: UFI FILTERS S.P.A., Mantova (IT)

( * ) Notice: Subject to any disclaimer, the term of this patent is extended or adjusted under 35 U.S.C. 154(b) by 36 days.

(21) Appl. No.: 17/632,637

(22) PCT Filed: Jul. 29, 2020

(86) PCT No.: PCT/IB2020/057157
§ 371 (c)(1),
(2) Date: Feb. 3, 2022

(87) PCT Pub. No.: WO2021/024104
PCT Pub. Date: Feb. 11, 2021

(65) Prior Publication Data
US 2022/0290590 A1    Sep. 15, 2022

(30) Foreign Application Priority Data

Aug. 7, 2019  (IT) .......................... 102019000014259

(51) Int. Cl.
*F02B 25/06* (2006.01)
*B01D 46/00* (2022.01)
(Continued)

(52) U.S. Cl.
CPC ......... *F01M 13/04* (2013.01); *B01D 46/0056* (2013.01); *B01D 46/2411* (2013.01);
(Continued)

(58) Field of Classification Search
CPC .......... F01M 13/04; F01M 2013/0422; F01M 2013/0438; B01D 46/0056; B01D 46/2411; B04B 5/005; Y10S 210/17
(Continued)

(56) References Cited

U.S. PATENT DOCUMENTS

| 3,197,029 A | * | 7/1965 | Yelinek | B01D 27/08 |
| | | | | 210/DIG. 17 |
| 3,342,339 A | * | 9/1967 | Riolo | B01D 27/08 |
| | | | | 210/DIG. 17 |

(Continued)

FOREIGN PATENT DOCUMENTS

| FR | 2 622 469 A1 | 5/1989 |
| FR | 2 933 626 A1 | 1/2010 |

(Continued)

OTHER PUBLICATIONS

International Search Report and Written Opinion of the International Searching Authority for International Patent Application No. PCT/IB2020/057157 dated Nov. 13, 2020, 9 pages.

(Continued)

*Primary Examiner* — Long T Tran
*Assistant Examiner* — James J Kim
(74) *Attorney, Agent, or Firm* — Merchant & Gould P.C.

(57) ABSTRACT

A blow-by gas filtration assembly fluidically connects to a crankcase ventilation circuit of an internal combustion engine. The filtration assembly has an axis and includes a filter group having a hollow cylindrical shape with a central chamber radially traversable by the blow-by gases, preferably from the outside to the inside. In addition, the filtration assembly includes a support and control member engageable to the filter group for supporting it in an axial position along the axis and for controlling it in rotation around the axis to perform the filtration operations. The member and the filter group include, respectively, a threaded member portion and a threaded filter portion engageable by reciprocal screwing. The member and the filter group also include, respectively, a member abutment and a filter abutment axially engageable along the axis to prevent further screwing of the threaded member portion and a threaded filter portion.

20 Claims, 6 Drawing Sheets

(51) Int. Cl.
   *B01D 46/24* (2006.01)
   *B01D 46/26* (2006.01)
   *F01M 13/04* (2006.01)

(52) U.S. Cl.
   CPC ..... *B01D 46/26* (2013.01); *F01M 2013/0422* (2013.01); *F01M 2013/0438* (2013.01)

(58) Field of Classification Search
   USPC ........................................................ 123/573
   See application file for complete search history.

(56) References Cited

U.S. PATENT DOCUMENTS

| | | | |
|---|---|---|---|
| 6,033,578 A * | 3/2000 | Loewen | B01D 35/31 |
| | | | 210/DIG. 17 |
| 8,293,103 B2 * | 10/2012 | Johnson | B01D 27/08 |
| | | | 210/450 |
| 9,545,591 B2 * | 1/2017 | Parikh | B01D 46/2403 |
| 10,010,819 B2 * | 7/2018 | Jensen | B01D 27/08 |
| 10,478,764 B2 * | 11/2019 | Bonne | B01D 46/003 |
| 10,537,842 B2 * | 1/2020 | Parikh | B01D 45/14 |
| 2002/0170279 A1 * | 11/2002 | Gustafson | B01D 29/055 |
| | | | 55/510 |
| 2007/0267339 A1 * | 11/2007 | Munn | B01D 35/306 |
| | | | 210/450 |

FOREIGN PATENT DOCUMENTS

| | | | | |
|---|---|---|---|---|
| FR | 2933626 A1 * | 1/2010 | ......... | B01D 46/0031 |
| GB | 1 488 500 A | 10/1977 | | |
| WO | 2016/070248 A2 | 10/2016 | | |

OTHER PUBLICATIONS

Italian Search Report for Italian Patent Application No. 102019000014259 dated May 25, 2020, 2 pages.

* cited by examiner

BLOW-BY GAS FILTRATION ASSEMBLY WITH THREADED FILTER PORTION This application is a National Stage Application of PCT/IB2020/057157, filed 29 Jul. 2020, which claims benefit of Ser. No. 102019000014259, filed 7 Aug. 2019 in Italy, and which applications are incorporated herein by reference. To the extent appropriate, a claim of priority is made to each of the above-disclosed applications.

FIELD OF APPLICATION

The present invention relates to a blow-by gas filtration assembly.

In particular, the blow-by gas filtration assembly of the present invention can be fluidly connected to the crankcase ventilation circuit of an internal combustion engine system inside of a vehicle to receive blow-by gases (from said crankcase) and filter from them the suspended particles contained therein.

Specifically, "blow-by gas" means oil vapours vented from the crankcase of an internal combustion engine during its operation. In particular, said blow-by gases have a composition similar to that of exhaust gases and are generated by combustion of the air/fuel mixture in the combustion chamber. Instead of reaching the exhaust gas emission circuit, these gases leak into the lower portion of the crankcase, passing alongside the cylinders and bringing carbon particles and oil drops with them. In the present discussion, for the sake of simplicity, blow-by gases are considered to consist of air and suspended particles; said suspended particles comprise oil droplets and/or carbonaceous particulates.

STATE OF THE ART

In the state of the art, solutions of filtration assemblies that is fluidly connectable to the crankcase and suitable for venting it from blow-by gases are known of.

Specifically, blow-by gas filtration assembly solutions which separate unwanted suspended particles from the aforesaid blow-by gases are known of, comprising a filter group having such purpose.

In the state of the art, a plurality of embodiments of filtration assemblies comprising a filter group comprising a porous-type filter medium, driven in rotation by a specially shaped support and control member such that the suspended particles are separated from the air both by passing through the porous material and by the action of the centrifugal force, are known of.

In fact, solutions are known in the state of the art in which said support and control member comprises a control drive of the mechanical type, for example connected to a rotating element of the vehicle, such as the camshaft of the engine, or of the electrical type comprising a specific electric motor.

Such embodiments typically have a complex shape especially in the connection methods between the filter group and the control member. In particular, such embodiments have a complex coupling of the two components (or groups of components): this involves particularly complex assembly (and disassembly) operations and involves a certain risk of angular misalignment in the rotational operations of the filter group.

Solution According to the Invention

In the aforesaid state of the art the need is therefore strongly felt to have a blow-by gas filtration assembly that solves the aforesaid problem, being simple in shape and above all having simple reciprocal coupling methods of the filter group and support and control member.

The purpose of the present invention is to provide a new embodiment of a blow-by gas filtration assembly which satisfies said requirement.

Such purpose is achieved by the blow-by gas filtration assembly claimed in claim 1. The dependent claims show preferred embodiment variants having further advantageous aspects.

DESCRIPTION OF THE DRAWINGS

Further characteristics and advantages of the invention will, in any case, be evident from the description given below of its preferred embodiments, made by way of a non-limiting example with reference to the appended drawings, wherein.

DETAILED DESCRIPTION

Figure 1:
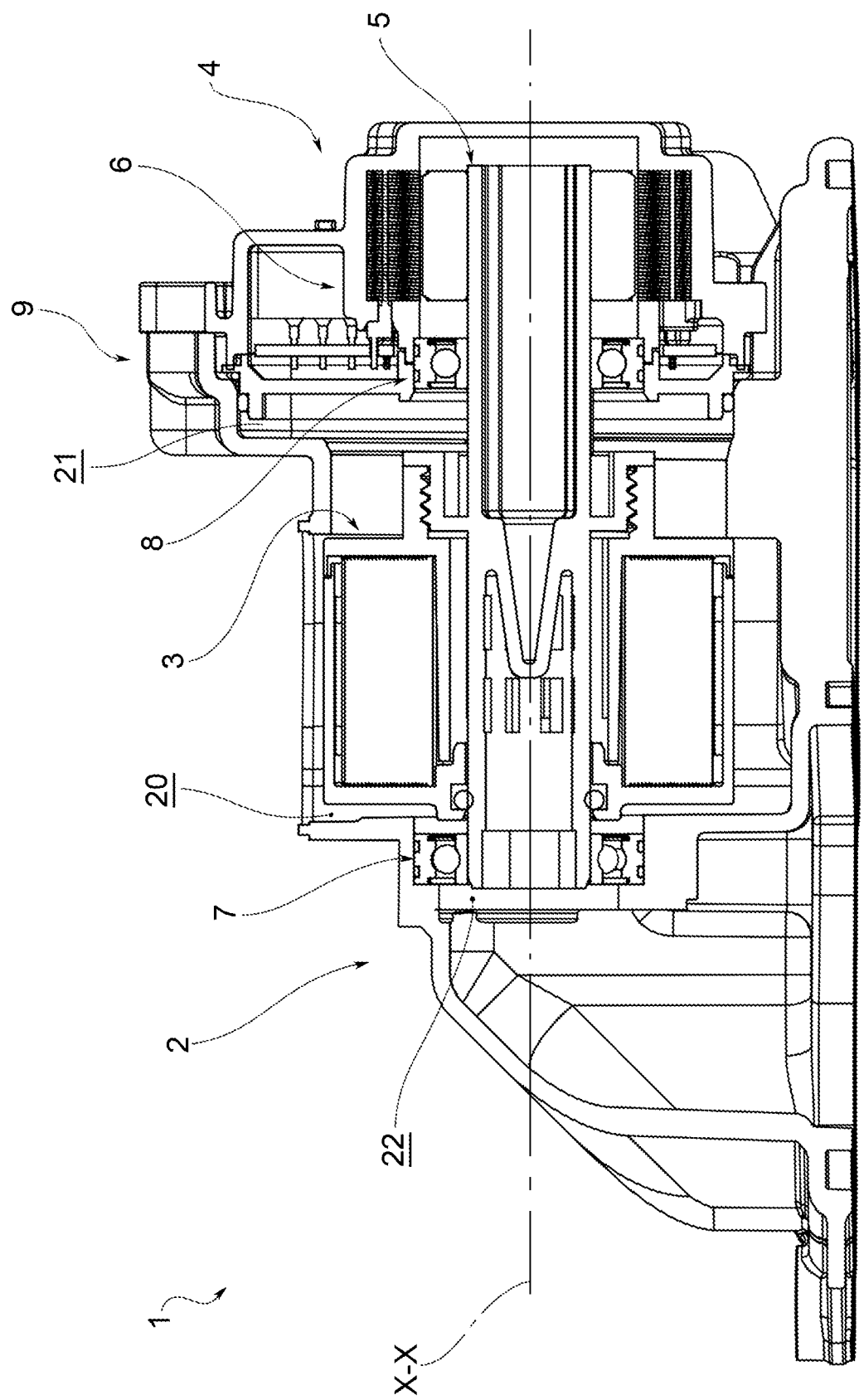
FIG. 1 shows a cross-section view of a blow-by gas filtration assembly according to the present invention, according to a preferred embodiment.
Figure 2:
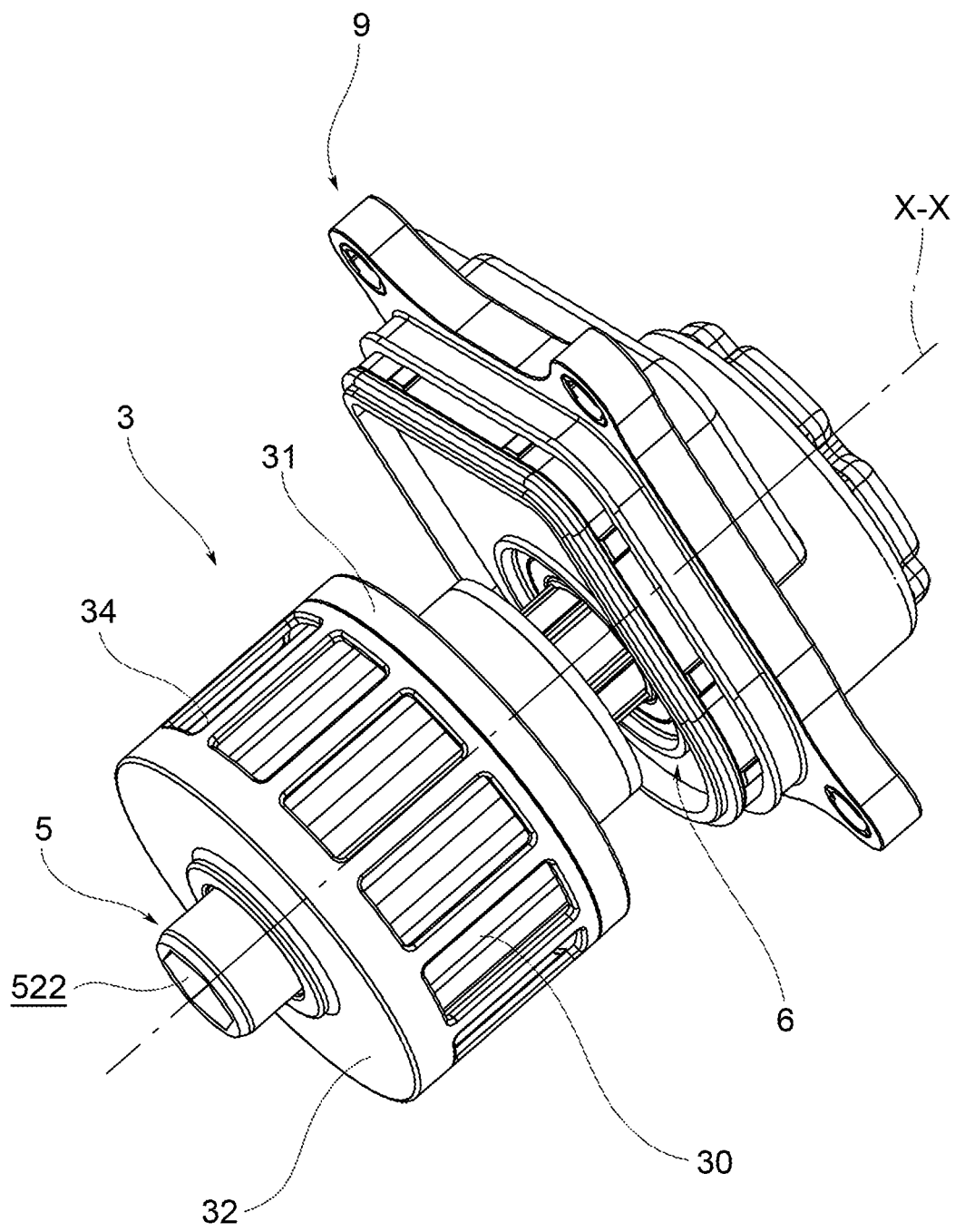
FIG. 2 shows a perspective view of some components of the blow-by gas filtration assembly in FIG. 1.
Figure 3A:
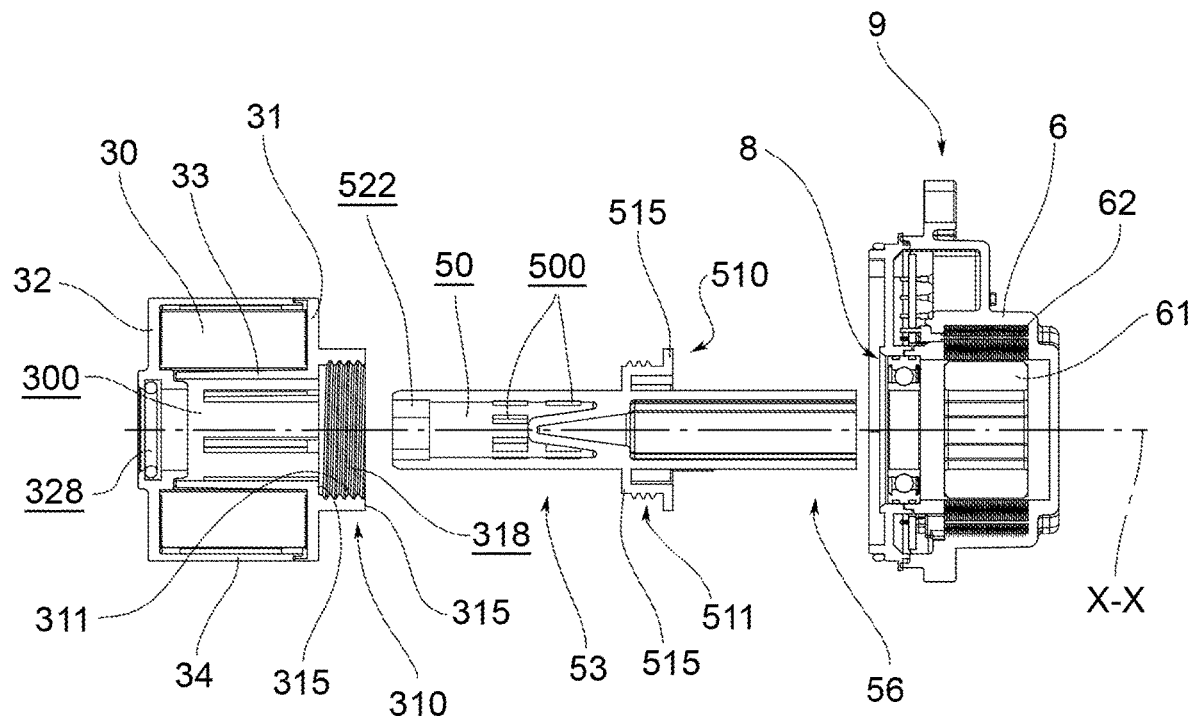
FIG. 3a shows a cross-section view of FIG. 3.
Figure 3:
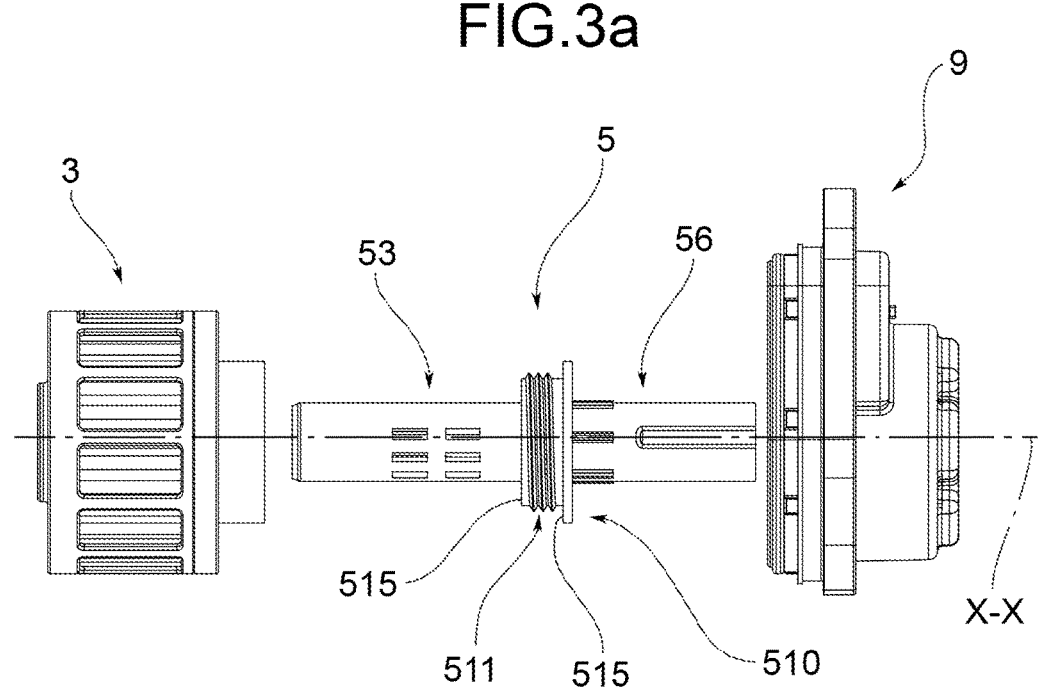
FIG. 3 shows a side view in separate parts of FIG. 2, according to a first embodiment.
Figure 4:
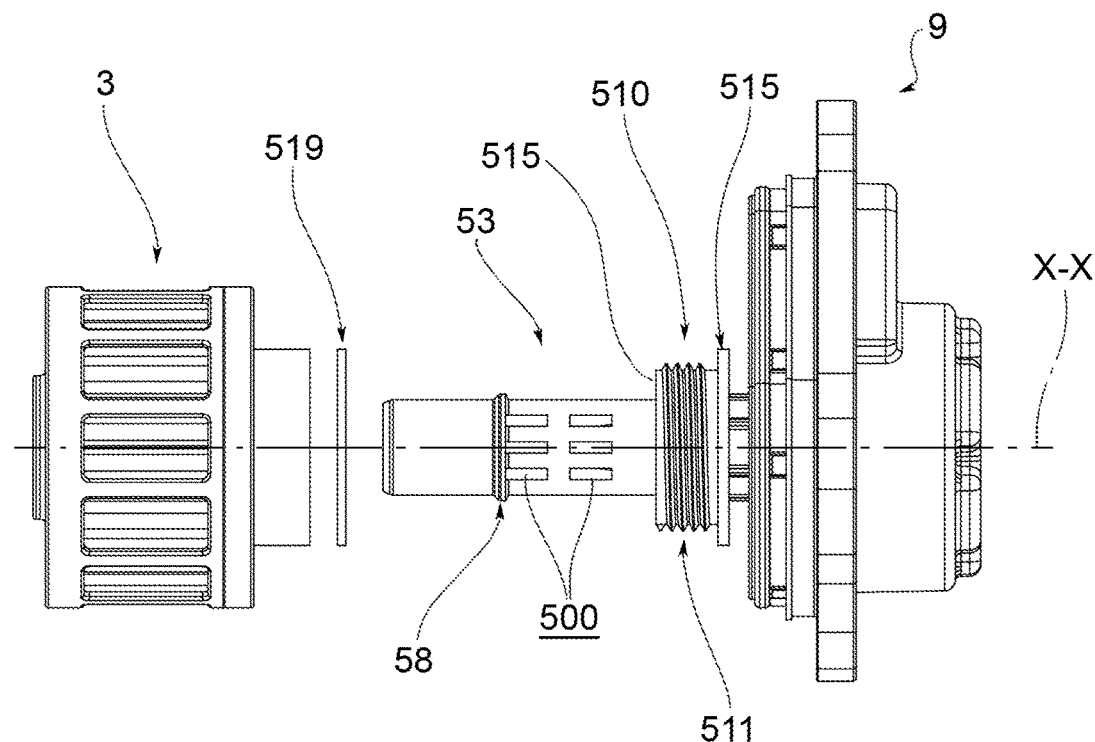
FIG. 4 shows a side view in separate parts of FIG. 2, according to a second embodiment.
Figure 4A:
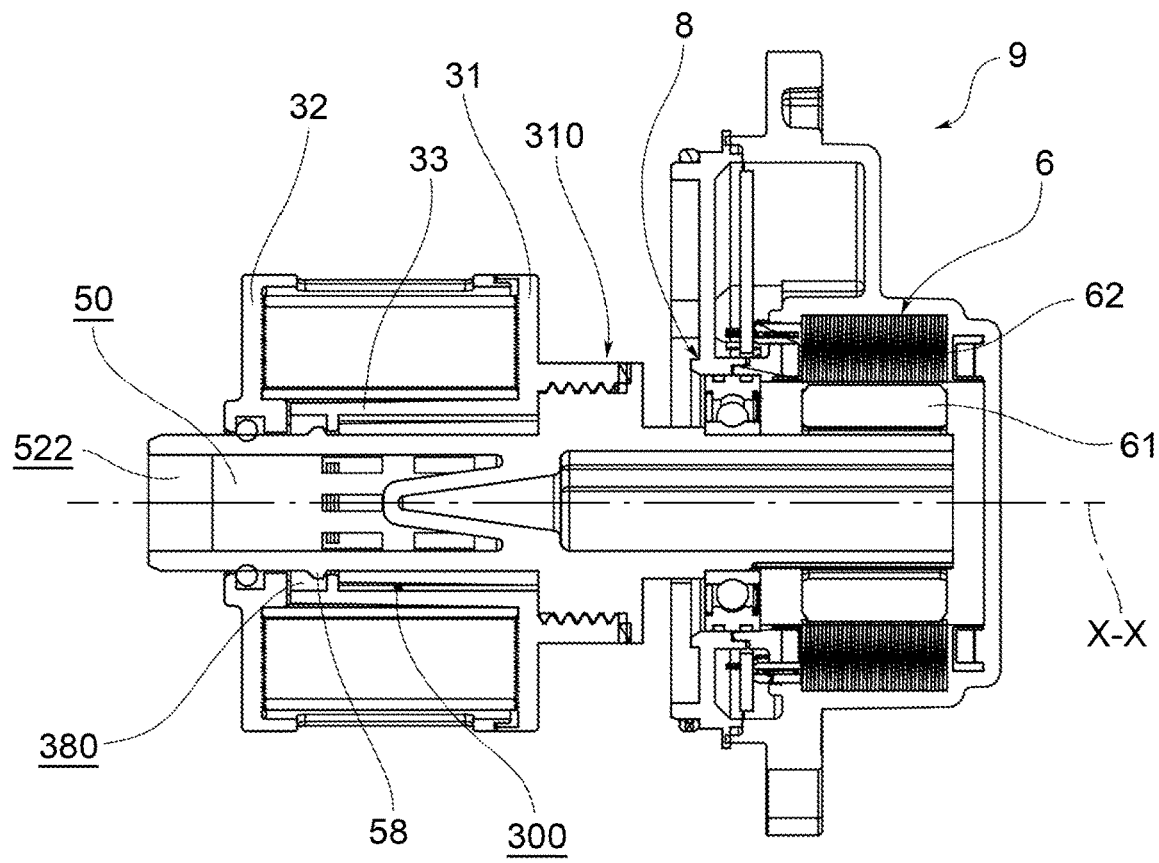
FIG. 4a shows a cross-section view of the components as in FIG. 4, assembled.
Figure 5:
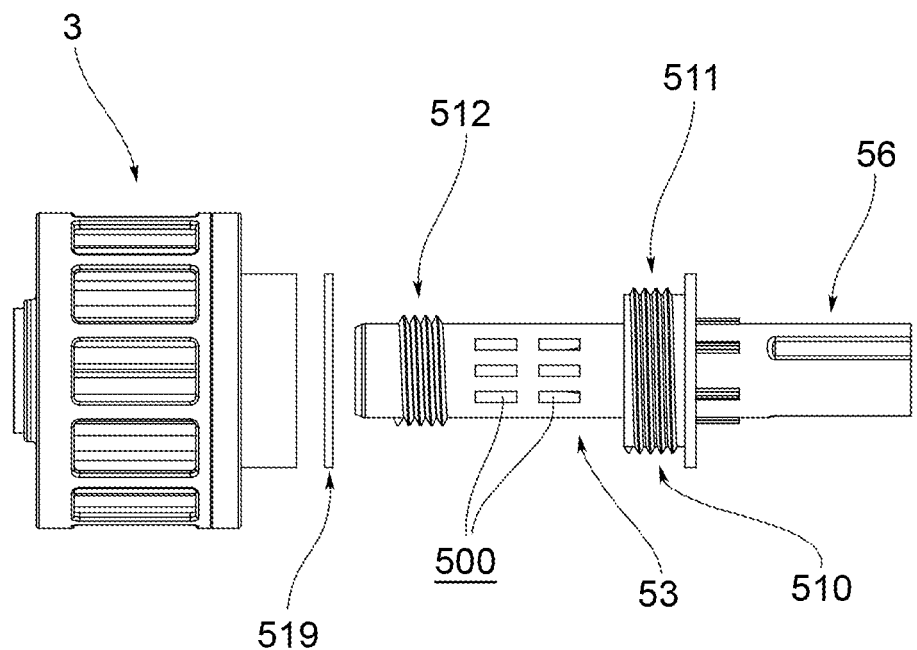
FIG. 5 shows a side view in separate parts of some components shown in FIG. 2, according to a third embodiment.
Figure 5A:
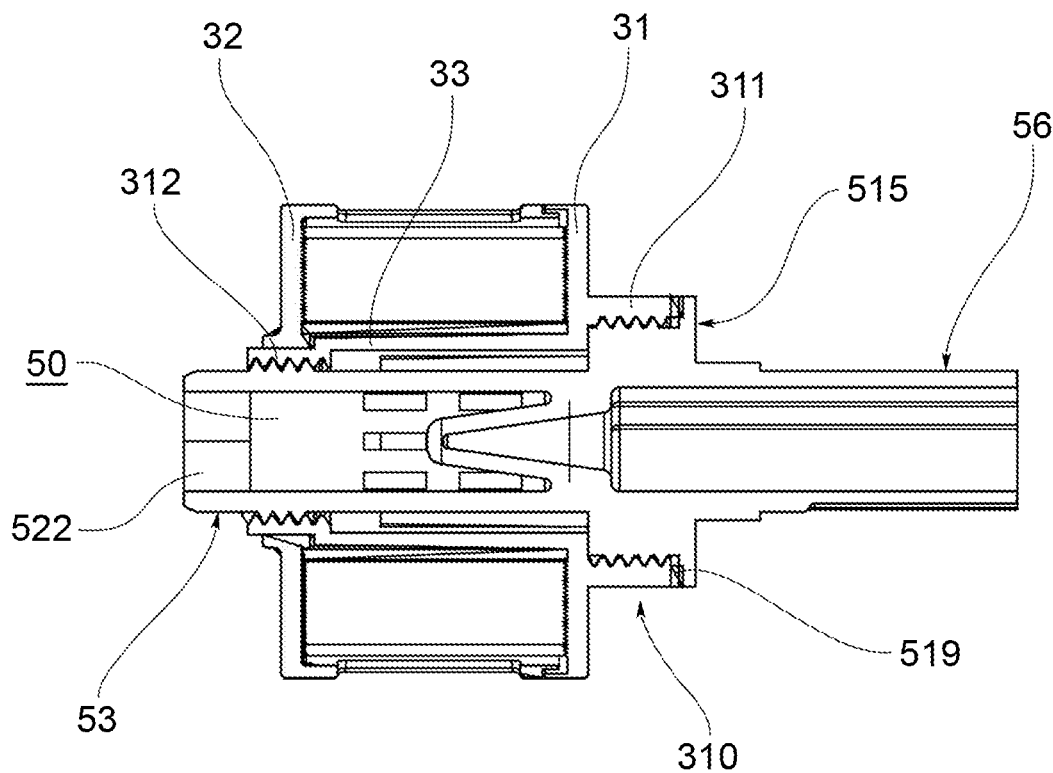
FIG. 5a shows a cross-section view of the components as in FIG. 5, assembled.
Figure 6:
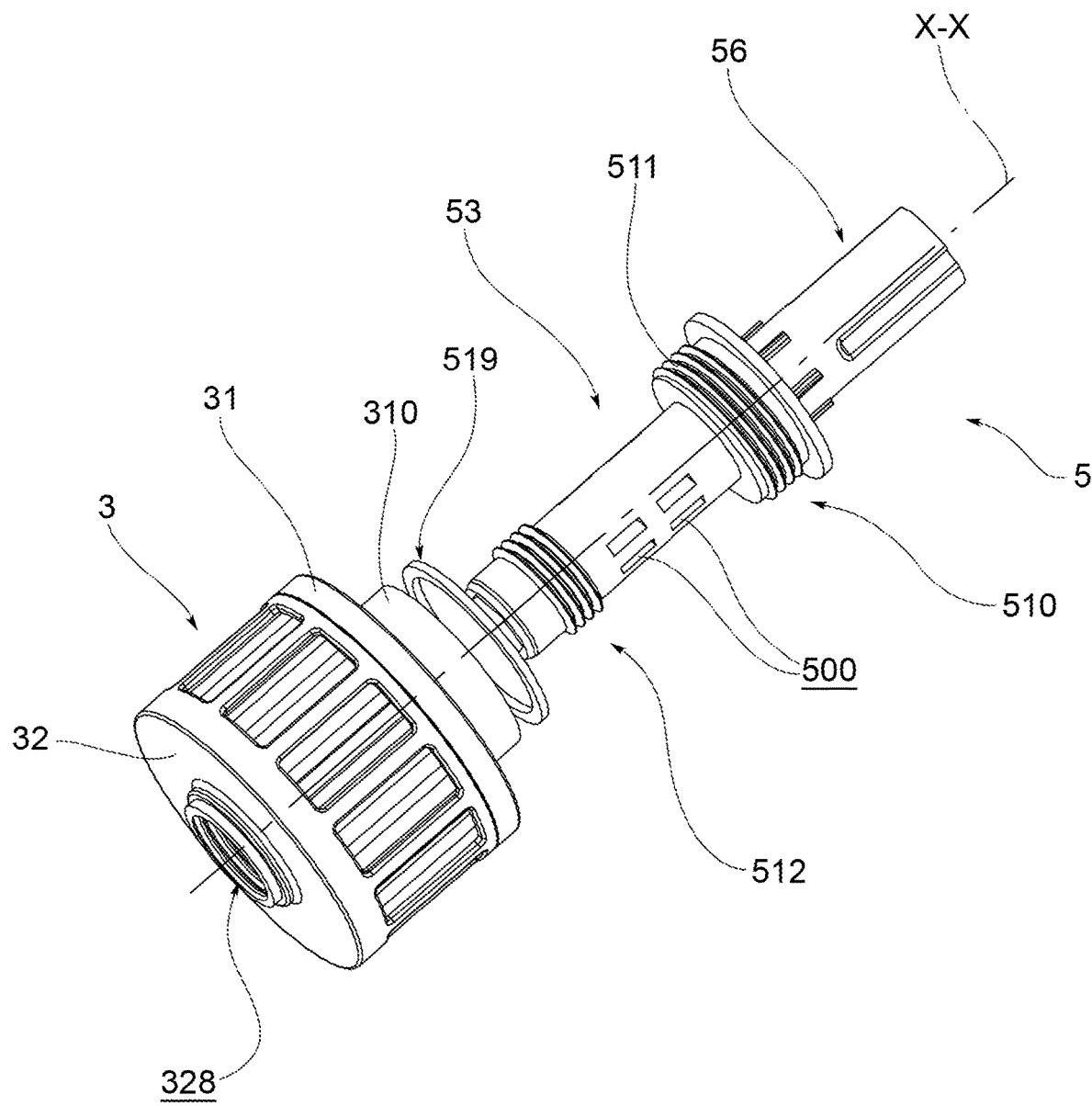
FIG. 6 shows a perspective view in separate parts of the components as in FIG. 5.

With reference to the appended drawings, reference numeral 1 denotes a blow-by gas filtration assembly suitable for performing a filtration/separation action on particles (liquid and/or solid) suspended in the gas stream.

Said blow-by gas filtration assembly 1 can be fluidly connected to a crankcase ventilation circuit of an internal combustion engine of a vehicle to receive blow-by gases and filter from them the suspended particles contained therein returning a stream of clean gas (i.e. filtered) to other vehicle systems such as, for example, to the engine air intake circuit communicating with the combustion chamber of the internal combustion engine.

Preferably, said blow-by gas filtration assembly 1 can be directly assembled to the crankcase of an internal combustion engine of a vehicle. In particular, the present invention is not limited to this feature; the blow-by gas filtration assembly 1 could be configured as a stand-alone device comprising respective inlet and outlet ports communicating respectively with the crankcase, for receiving blow-by gases to be filtered, and with the air intake circuit, for recirculating the gas stream filtered of solid and liquid particles towards the combustion chamber.

According to the present invention, the filtration assembly 1 comprises an X-X axis with respect to which the components described below extend or are positioned.

According to a preferred embodiment, the blow-by gas filtration assembly 1 comprises a main body 2. Preferably, the other components of the system are positioned in or on said main body 2, as described extensively below and evident from the exemplary figures attached below.

In particular, the main body 2 comprises a filtration chamber 20 in which filtration/separation operations of the blow-by gases take place. The filtration chamber 20 is therefore fluidically connected to the crankcase ventilation circuit of an internal combustion engine of a vehicle to receive dirty blow-by gases, i.e. comprising suspended particles (solid and/or liquid), and to the engine air intake system to re-introduce clean blow-by gases, i.e. cleaned of the suspended particles, into said system.

According to a preferred embodiment, the main body 2 comprises respective blow-by gas inlets and outlets.

Preferably, the main body 2 comprises an inlet mouth (not shown) fluidically connected with the crankcase ventilation circuit of a vehicle to receive blow-by gases to be filtered. Preferably, said inlet mouth is made substantially parallel to the X-X axis spaced therefrom. Preferably, said inlet mouth is made on the side wall of the main body 2. Preferably, said inlet mouth is made on the wall of the main body 2 defining the filtration chamber 20.

Moreover, the main body 2 comprises an outlet mouth 22. Preferably, said outlet mouth 22 is made positioned on the X-X axis. Preferably, the outlet mouth 22 is perpendicular to said X-X axis. Preferably, the outlet mouth 22 is coaxial to the X-X axis.

The outlet mouth 22 is bounded laterally, annularly, by an outlet edge 220.

According to a preferred embodiment, from the outlet mouth 22, the main body 2 provides for an outlet connection that interfaces with the engine air intake circuit communicating with the combustion chamber of the internal combustion engine of a vehicle. According to a preferred embodiment, said outlet connection communicates with an outlet opening made on the coupling flange of the main body 2 to the internal combustion engine crankcase.

According to a preferred embodiment, moreover, the main body 2 comprises an assembly opening 21 through which the components described below is insertable inside the main body 2, preferably inside the filtration chamber 20. Preferably, said assembly opening 21 is made in a position opposite the outlet mouth 22. Preferably, the assembly opening 21 is made along the X-X axis having its extension (orientation) transverse to the X-X axis, preferably a perpendicular extension.

According to the present invention, the blow-by gas filtration assembly 1 comprises a filter group 3, specifically suitable for performing said filtration/separation operations of the particles suspended in the blow-by gases. Said filter group 3 is positionable and operates in the filtration chamber 20.

The filter group 3 extends along the X-X axis having a hollow cylindrical shape, comprising, in fact, a central chamber 300.

The filter group 3 can be crossed radially by blow-by gases. Preferably, the filter group 3 can be crossed by blow-by gases in a radial direction from the outside towards the inside.

Preferably, the inlet mouth is radially facing the filter group 3. According to a preferred embodiment, the inlet mouth is radially facing the outer surface of the filter group 3.

Preferably, said outlet mouth 22 is axially facing the central chamber 300.

In other words, the filter group 3 identifies, in the filtration chamber 20, a dirty side in which there are blow-by gases to filter and a clean side in which there are filtered blow-by gases. Preferably, the outlet mouth 22 is fluidly connected with said clean side.

According to a preferred embodiment, the central chamber 300 of the filter group surrounds the clean side in which the filtered blow-by gases are present and fluidly communicates with the outlet mouth 22.

According to a preferred embodiment, the filter group 3 comprises a filter medium 30. The filter medium 30, which can be crossed radially comprises a non-woven fabric pleated in the form of a star or a porous cylindrical septum.

Moreover, according to a preferred embodiment, the filter group 3 comprises a first filter plate 31 and a second filter plate 32 mutually arranged at the ends of the filter medium 30.

Preferably, the filter group 3 comprises a first filter plate 31 and a second plate 32 reciprocally engaged to the ends of the filter medium 30.

In addition, according to a preferred embodiment, the filter group 3 comprises a central structure 33 which is housed inside the filter medium 30 and joins the two filter plates 31, 32, so that the filter plates 31, 32 are integrally connected in rotation. Preferably, said central structure 33 has one or more through openings suitable to allow the passage of the fluid being filtered.

According to a preferred embodiment said central structure 33 is made in one piece with the first filter plate 31. In addition, according to a preferred embodiment, the filter group 3 comprises an outer structure 34 which surrounds the filter medium 30 on the outside and joins the two filter plates 31, 32. Preferably, said outer structure 34 has a plurality of through openings suitable to allow the passage of the fluid being filtered.

According to a preferred embodiment said central structure 33 is made in one piece with the second filter plate 32.

According to a preferred embodiment, said central structure 33 is a tubular body with one or more through openings engaging the filter plates 31, 32.

As shown in the attached figures, the central chamber 300 extends through the filter plates 31, 32 surrounded by the filter medium 30. According to a preferred embodiment, the central chamber 300 extends through respective through openings 318, 328 made on the filter plates 31, 32. Preferably, said openings 318, 328 are concentric to the X-X axis, like the central chamber 300.

According to the present invention, moreover, the filtration assembly 1 comprises a support and control member 4 engageable to the filter group 3 suitable for supporting it in an axial position along the X-X axis and suitable for controlling it in rotation around said X-X axis to perform the filtration operations.

In other words, said support and control member 4 is a component or group of components suitable for receiving or producing a rotational action on the filter group 3 to guide it in rotation.

According to a preferred embodiment, said support and control member 4 comprises a control drive 6 operatively connected to the filter group 3 to command it in rotation about the X-X axis.

Preferably, said control drive 6 is of the electrical type or of the mechanical type or of the electromechanical type.

According to a preferred embodiment, the control drive 6 is connected to external groups comprised in the vehicle, e.g. the camshaft.

According to a further preferred embodiment, the control drive 6 comprises an electric motor group 60 comprising a rotor 61 and a stator 62. The electromagnetic actuation of the stator 62 entails the rotation of the rotor 61 about the X-X axis. According to a preferred embodiment, the electric motor group 60 is of the electrical type, preferably brushless.

According to a preferred embodiment, the rotor 61 comprises one or more elements in ferromagnetic material arranged in the shape of a toroid.

Preferably, in addition, the support and control member 4 comprises a closing cover 9 sealingly mountable on the main body 2. Preferably, the closing cover 9 sealingly engages the main body 2 to close an assembly opening 21, provided on said main body. Preferably, said closing cover 9 supports said electric motor group 60. Preferably, the closing cover 9 can be mounted in an axial direction to the main body 2. Preferably, the closing cover is secured to the main body 2 by means of screws with bushing or self-tapping screws.

According to a preferred embodiment, the electric motor group 60 comprises an electronic board housed on the closing cover 9. Said electronic board is electrically connected to the vehicle control unit by means of an electrical connector integrated on the closing cover 9.

According to the present invention, the support and control member 4 and the filter group 3 comprise respectively a threaded member portion 511 and a threaded filter portion 311 engageable by reciprocal screwing around the X-X axis.

In other words, the member 4 and the filter group 3 are reciprocally connected rotationally by screwing of the aforesaid reciprocal portions.

Moreover, according to the present invention, the member 4 and the filter group 3 respectively comprise a reciprocally engageable member abutment 515 and filter abutment 315. By means of reciprocal engagement between the member abutment 515 and the filter abutment 315 any further screwing between the threaded member portion 511 and the threaded filter portion 311 is prevented. The engagement between the member abutment 515 and the filter abutment 315 involves the axial "end-stop" of the screwing between the two components.

In other words, the engagement between the member abutment 515 and the filter abutment 315 stops the reciprocal screwing between the control member 4 and the filter group 3 in the fixing direction, determining the axial position of the filter group along the X-X axis. This stop ensures the integral coupling between the control member 4 and the filter group 3 necessary for the transmission of the torque during all the operating phases of the group (the term operating is taken to mean the phases of start-up, rotation and stopping of the rotation of the filter group).

In other words, the engagement between the member abutment 515 and the filter abutment 315 determines the "integral" coupling between the two components so that the control member 4 and the filter group 3 are mechanically connected ("integrally") to rotate in unison (or synchronously).

According to a preferred embodiment, the member abutment 515 and the filter abutment 315 reciprocally engage in an axial direction. As for example shown in the embodiments, the member abutment 515 and the filter abutment 315 are obtained having an extension orthogonal to the X-X axis.

According to a preferred embodiment, the member abutment 515 and the filter abutment 315 reciprocally engage in a circumferential direction. For example, the member abutment 515 and the filter abutment 315 are obtained having an extension parallel to the X-X axis. For example, the member abutment 515 and the filter abutment 315 are obtained in the relative threads.

According to a preferred embodiment, the support and control member 4 comprises a shaft 5.

Such shaft 5 is a hollow body extending along the X-X axis and is specially designed to be operatively connected to the filter group 3 and the control drive 6.

Preferably, the shaft 5 is a hollow body made as a single component.

According to an alternative embodiment, the shaft is a hollow body composed of two or more parts mechanically couplable to each other (e.g. by welding, mechanical couplings, screws or the like) reversibly or irreversibly so as to form a single component the constituent parts of which rotate synchronously upon command by the control drive 6.

The shaft 5 in fact comprises a control portion 56 engaged to the control drive 6 and a filter portion 53 engaged to the filter group 3.

The shaft 5 in fact comprises a control portion 56 engaged to the control drive 6 and a filter portion 53 on which the filter group 3 is housed.

Preferably, said rotor 61 is housed on the control portion 56. In particular, the rotor 61 and the filter group 3 are mounted integrally to the shaft 5 respectively to the control portion 56 and to the filter portion 53 in such a way that a controlled rotation of the rotor 61 corresponds to a rotation of the shaft 5 and thus of the filter group 3. In particular, in the present description, "integrally" means that the control drive 6 and the filter group 3 are mechanically connected to the shaft 5 to rotate in unison (or synchronously).

According to a preferred embodiment, the filter group 3 and the filter portion 53 are reciprocally engaged, comprising along the X-X axis respectively a threaded filter portion 311 and a threaded member portion 511 so as to install the filter group 3 on the shaft 5 by reciprocal screwing. That is to say, preferably, the threaded member portion 511 is comprised in the shaft 5.

According to a preferred embodiment, the threaded member portion 511 is the screw and the threaded filter portion 311 is the lead screw.

According to a preferred embodiment, the threaded filter portion 311 is the screw and the threaded member portion 511 is the lead screw.

According to a preferred embodiment, the filter group 3 can be screwed to the shaft 5 housing respective portions thereof.

Preferably, the threaded member portion 511 and the threaded filter portion 311 have a direction of extension (or reciprocal engagement) opposite to the direction of rotation controlled by the member 4 in the filtration operations. According to such preferred embodiment, the rotary action transmitted to the filter group 3 and controlled by the member 4 avoids possible unscrewing of the filter group 3 from the member 4. Preferably, therefore, the rotary action transmitted to the filter group 3 by the member 4 maintains and consolidates the engagement between the member abutment 515 and the filter abutment 315.

According to a preferred embodiment, the member 4, preferably the shaft 5, comprises a locking crown 510 and the filter group 3 comprises a locking ring 310 on which the respective threads are respectively obtained. For example, said threaded member portion 511 is obtained on said locking crown 510 and the threaded filter portion 311 is obtained on said locking ring 310.

Preferably, the locking crown 510 is positioned radially distal to the X-X axis and the locking ring 310 is positioned in a complementary manner to engage and house said locking crown 510. Preferably, therefore, as shown in the drawings provided by way of example, the locking crown 510 is radially distant from the X-X axis. At the same time, preferably, the locking ring 310 is also radially distant from the X-X axis.

Preferably, the locking crown is made directly on the outer surface of the member 4, preferably on the outer surface of the shaft 5.

According to a preferred embodiment, the locking crown 510 comprises said member abutment 515.

Preferably, said member abutment 515 has a radial extension relative to the X-X axis and is positioned on at least one axial end of the threaded member portion 511 obtained on the locking crown 510. In some preferred embodiments, two member abutments 515 are comprised at both ends of the threaded member portion 511.

Preferably, the filter group 3, in particular its locking ring 310 is also shaped so as to present at least one filter abutment 315 specially shaped to engage the respective member abutment 515.

According to a preferred embodiment, member abutment 515 and/or filter abutment 315 have an annular extension.

According to a preferred embodiment, there is a sealed engagement of the member abutment 515 and the filter abutment 315 in the axial direction. Preferably, the blow-by gas filtration assembly 1 comprises a gasket element 519 axially interposed between the member abutment 515 and the filter abutment 315, sealed tight in the axial screwing of the threaded portions described.

According to a preferred embodiment, the filter group 3 sealingly engages the member 4, preferably the shaft 5, in two axially distinct sealing regions.

Preferably, said two sealing regions are located in the vicinity of the first filter plate 31 and a second filter plate 32.

According to a preferred embodiment, the engagement between the threaded member portion 511 and the threaded filter portion 311 is sealed. According to one embodiment, such seal is obtained by means of the aforementioned axial gasket 519. According to other embodiment variants, it is the thread itself which performs the seal.

According to a preferred embodiment, the threaded filter portion 311 is obtained on the first filter plate 31. Preferably, the threaded filter portion 311 is positioned on an opposite side of the first filter plate 31 to that engaged to the filter medium 30.

In other embodiments, the threaded filter portion 311 is obtained inside the central chamber 300, the latter specially shaped, in particular on the central structure 33.

According to a preferred embodiment, the filter group 3 comprises an auxiliary threaded member portion 312 in a region axially distal from the filter threaded portion 311 and the member 4 comprises an auxiliary threaded member portion 512.

Preferably, the auxiliary threaded member portion 312 and the auxiliary threaded member portion 512 have the same characteristics described for the threaded filter portion 311 and the threaded member portion 511.

According to a preferred embodiment, such auxiliary filter-member coupling is sealed. Preferably, the threaded coupling is sealed. Preferably, the member 4 comprises a second axial and/or radial gasket.

According to a preferred embodiment, the central structure 33 comprises said auxiliary threaded member portion 312.

According to an embodiment variant, the second end plate 32 comprises said auxiliary threaded member portion 312.

According to a preferred embodiment, wherein the member 4 comprises the shaft 5, said auxiliary threaded member portion 512 is comprised and obtained on the shaft 5.

According to a preferred embodiment, the shaft 5 comprises air slits 500, axially positioned between the two sealing regions. Said air slits 500 are suitable to place in fluidic communication the air duct 50 and the central chamber 300.

According to a preferred embodiment, there are a plurality of slits 500 and they are positioned mutually angularly equidistant.

Moreover, according to a preferred embodiment, the shaft 5 comprises a retention element 58 suitable to be housed in a retention cavity 380 obtained in the filter group 3. Preferably, the retention element 58 obstructs the axial movement of the filter group 3 relative to the shaft 5. Preferably, the retention element 58 has an annular extension.

In other words, in a configuration in which the filter group 3 is mounted on the shaft 5, the retention element 58 is housed in a retention cavity 380 (preferably, obtained on the central structure 3). That is to say, in order to disassemble the filter group 3 from the shaft 5—by unscrewing—the obstacle as in the retention element 58 must be overcome.

According to a preferred embodiment, the retention element 58 is an annular rib provided on the outer surface of the shaft 5. Said rib has the function of preventing unintentional disengagement of the connection between the shaft 5 (control member 4) and filter group 3 during the operation of the filtration assembly 1.

In other words, in order to allow the removal of the filter group 3 from the shaft 5, the operator must rotate the filter group 3 with respect to the shaft 5 in the opposite direction to the fixing direction, forcing the retention cavity 380 provided on the filter group to pass over said rib, allowing the final removal of the filter group 3 from the shaft 5.

As shown in the accompanying drawings, according to a preferred embodiment, the filter portion 53 comprises therein an air duct 50, preferably an outlet of the filtered blow-by gases, in which the outflow of said filtered blow-by gases towards the outlet mouth 22 takes place. In yet other words, the shaft 5 is a hollow body the cavity of which forms at least partially the air duct 50 of the filtered blow-by gases.

In other words, the air duct 50 connects the clean side of the filter group 3 to the outlet mouth 22. In yet other words, the blow-by gases already subjected to filtration operations flow out into the air duct 50.

Preferably, the air duct 50 fluidically connects the central chamber 300 of the filter group 3 to the outlet mouth 22.

According to a preferred embodiment, the filter portion 53 is fluidically connected with the central chamber 300 and the outlet mouth 22 to make the filtered blow-by gases flow out.

Preferably, the shaft 5 comprises a duct outlet 522, which fluidically connects the inside of the air duct 50 and the outlet mouth 22. Preferably, the duct outlet 522 is positioned at an axial end of the shaft 5.

Preferably, the duct outlet 522 is positioned at the outlet mouth 22. Preferably, the duct outlet 522 is placed on the shaft 5 at the end of the filter portion 53. Preferably, the duct outlet 522 is positioned on the shaft 5 at the axial end of the filter portion 53 in a distal to the control portion 56. Preferably, the duct outlet 522 is obtained on the control portion 56. Preferably the duct outlet 522 is placed on the shaft 5 at the axial end of the control portion 56. Preferably, the duct outlet 522 is positioned on the control portion 56 of the shaft 5 in an intermediate axial position proximal to the filter group 3.

According to a preferred embodiment, the blow-by gas filtration assembly 1 comprises a first support bearing 7 keyed onto the shaft 5.

According to a preferred embodiment, the blow-by gas filtration assembly 1 comprises a second bearing 8, for support, which can be keyed onto the shaft 5.

Preferably, by means of the first bearing 7 and the second bearing 8 the shaft 5 is positioned along the X-X axis. Preferably, by means of the first bearing 7 and the second bearing 8 the shaft axis 5 is aligned with the X-X axis.

The present invention is not limited to the shape or type of the first and second bearings; preferably, the term "bearing" means a sliding bearing, a ball bearing, or a bushing.

According to a preferred embodiment, the first bearing 7 sealingly closes the filtration chamber 20. Preferably, the first support bearing 7 engages the outlet edges 220 defining the outlet mouth 22.

According to a preferred embodiment, the first bearing 7 is positionable on the filter portion 53 in an axial position proximal to the filter group 3 in an axial position distal from the control drive 6.

According to a preferred embodiment, the second bearing 8 is positionable on the control portion 56.

According to a preferred embodiment, the control portion 56 of the shaft 5 is also hollow.

According to a preferred embodiment, the shaft 5 is made of thermoplastic material obtained by means of a single moulding operation.

Preferably, the shaft 5 is made of polyphenylene sulphide (PPS).

Preferably, the shaft 5 is made of a polyphenylene sulphide (PPS) based material.

Preferably, the shaft 5 is made of a polyphenylene sulphide (PPS) based material reinforced with fibreglass (PPS+GF15, PPS+GF30, PPS+GF40).

Preferably, the shaft 5 is made of a nylon-based material (PA, PA 6, PA 6.6 or a mixture thereof).

Preferably, the shaft 5 is made of nylon-based material reinforced with fibreglass. (PA+GF, PA 6.6+GF35, PA 6+PA 6.6+GF 35)

Preferably, the shaft 5 is made of a material comprising a polyamide-based compound (e.g. PPA).

According to a preferred embodiment, the shaft 5 is made of metal. Preferably, the shaft 5 is made of aluminium alloy.

The present invention is not limited to either the type of thread or the embodiment of the threaded portions in the material of the filter plates, the central structure or the control member, with the exception of the features described above.

According to a preferred embodiment, such threaded portions could be provided by means of threaded portions assembled or placed on the various components.

Innovatively, the blow-by gas filtration assembly of the present invention widely fulfils the purpose of the present invention by presenting itself in a simple form and above all requiring simple assembly and disassembly operations.

Advantageously, the engagement between the member and the filter group is certain and safe.

Advantageously, the risk of the member and filter group disengaging from each other, for example due to breakage or malfunction, is substantially obviated.

Advantageously, the member is a multifunctional component. Advantageously, the blow-by gases flow through the support and control member. Advantageously, the filter group is controlled in rotation by means of the support and control member.

Advantageously, the support and control member, in a preferred embodiment, comprises a shaft, hollow or made at least partially in a hollow shape, reducing the weight of the filtration assembly, the consumption associated with the operation of the filtration assembly and the mechanical stresses on the means provided for keeping the filter group in rotation.

Advantageously, the filter group is simple and safe to fit/remove from the member, thus facilitating the assembly and maintenance of the filtration assembly.

Advantageously, the assembly of the filter group and the control member is uniquely achievable, ensuring the installation of original cartridges during periodic maintenance operations of the vehicle.

Advantageously, the engagement between the filter group and the control member is evenly distributed around the rotation axis minimizing localized stresses and ensuring the maintenance of the coupling between the filter group and the control member for the entire duration of the maintenance interval envisaged for the filter group.

Advantageously, the threaded engagement allows the permanent coupling of the filter group and the control member, minimizing vibrations, imbalances and unwanted stresses transmitted to the components designed to place the filter group in rotation. The filtration assembly is both simpler and more reliable.

Advantageously, the engagement between the filter group and the control member is achieved with very strict coupling tolerances ensuring a precise transmission of the torque between the control member and the filter group.

Advantageously, the engagement between the filter group and the control member is realized with very strict coupling tolerances, without unwanted clearance, minimizing power dissipation during the rotation of the control member and its maintenance in rotation (with the filter group fixed therein).

Advantageously, the engagement between the filter group and the control member minimizes residual stresses at the interface region by offering the opportunity to extend the coupling system to filter groups of different diameters and/or operating at different rotation speeds.

Advantageously, the engagement between the filter group is simple and intuitive and allows a reduction of the assembly times of the filtration assembly as well as the maintenance times of the filter.

Advantageously, the respective interface surfaces provided between the filter group and the control member are simple to create/integrate on the respective components, thus reducing the production costs of the assembly and/or filter group.

Advantageously, a locking portion (hexagonal shape) can be provided on the control member that can be used to block the rotation of the control member during maintenance operations and facilitate screwing/unscrewing of the filter group and therefore the engagement/disengagement of the coupling.

Advantageously, the respective abutments provided between the member and the filter group are positionable in a generic position along the X-X axis of the filtration assembly regardless of the axial position of the respective threaded portions.

It is clear that a person skilled in the art may make modifications to the blow-by gas filtration assembly so as to satisfy contingent requirements, all contained within the scope of protection as defined by the following claims.

LIST OF REFERENCE NUMBERS

1 blow-by gas filtration assembly
2 main body
20 filtration chamber
21 assembly opening 22 outlet mouth
220 outlet edge
3 filter group
30 filter medium
31 first filter plate
32 second filter plate
310 locking ring
311 threaded filter portion
312 auxiliary threaded member portion
315 filter abutment
318, 328 through openings
33 central structure
34 outer structure
300 central chamber
380 retention cavity
4 support and control member
5 shaft
50 air duct
53 filter portion
56 control portion
500 air slits
510 locking crown
511 threaded member portion
512 auxiliary threaded member portion
515 member abutment
519 axial gasket
522 duct outlet
58 retention element
6 control drive
60 electric motor group
61 rotor
62 stator
7 first bearing
8 second bearing
9 closing cover
X-X rotation axis

The invention claimed is:

1. A blow-by gas filtration assembly which is fluidically connectable to a crankcase ventilation circuit of an internal combustion engine to receive blow-by gases and filter from suspended particles contained in the blow-by gases, wherein the blow-by gas filtration assembly has an axis and comprises:
  a filter group which extends along the axis, having a hollow cylindrical shape with a central cavity which is traversable by blow-by gases radially;
  a support and control member engageable to the filter group for supporting the filter group in an axial position along the axis and for controlling the filter group in rotation around said axis to perform filtration operations;
  wherein the support and control member and the filter group comprise, respectively, a threaded member portion and a threaded filter portion engageable by reciprocal screwing around the axis;
  wherein the support and control member and the filter group comprise, respectively, a member abutment and a filter abutment, wherein axial engagement between the member abutment and the filter abutment prevents further screwing of the threaded member portion to a threaded filter portion; and
  wherein the threaded member portion and the threaded filter portion are reciprocally engageable in screwing around the axis and in a rotary direction opposite to the direction of rotation around which the filter group is controlled in rotation in the filtration operations.

2. The blow-by gas filtration assembly according to claim 1, wherein the threaded member portion is a screw and the threaded filter portion is a lead screw.

3. The blow-by gas filtration assembly according to claim 1, wherein the support and control member comprises a locking crown and the filter group comprises a locking ring, wherein the threaded member portion is on said locking crown and the threaded filter portion is on said locking ring.

4. The blow-by gas filtration assembly according to claim 3, wherein the locking crown is positioned radially distal to the axis and the locking ring is positioned in a complementary manner to engage and house said locking crown.

5. The blow-by gas filtration assembly according to claim 3, wherein said member abutment has a transverse extension with respect to the axis and is positioned on at least one axial end of the threaded member portion on the locking crown.

6. The blow-by gas filtration assembly according to claim 1, comprising a gasket element axially interposed between the member abutment and the filter abutment.

7. The blow-by gas filtration assembly according to claim 1, wherein the filter group comprises a filter medium, a first filter plate and a second filter plate respectively positioned at ends of the filter medium.

8. The blow-by gas filtration assembly according to claim 7, wherein the threaded filter portion is made on the first filter plate.

9. The blow-by gas filtration assembly according to claim 8, wherein the threaded filter portion is positioned on an opposite side of the first filter plate to a side engaged to the filter medium.

10. The blow-by gas filtration assembly according to claim 7, wherein the filter group further comprises a central structure housed in the central chamber integrally connecting the first filter plate and the second filter plate.

11. The blow-by gas filtration assembly according to claim 10, wherein the central structure, or the second filter plate, comprises an auxiliary threaded member portion in a region axially distal to the threaded filter portion and the support and control member comprises an auxiliary threaded member portion in a second region axially distal to the threaded member portion respectively to engage each other by reciprocal screwing of the filter group and member in said second region.

12. The blow-by gas filtration assembly according to claim 1, wherein the support and control member comprises a control drive for controlling in rotation the filter group.

13. The blow-by gas filtration assembly according to claim 12, wherein said control drive comprises an electric motor comprising a rotor and a stator, wherein said rotor is engaged to the control portion of the shaft.

14. The blow-by gas filtration assembly according to claim 1, wherein the central cavity of the filter group is traversable by blow-by gases radially from outside to inside.

15. The blow-by gas filtration assembly according to claim 1, wherein the control portion engageable the support and control member.

16. The blow-by gas filtration assembly according to claim 1, wherein said threaded member portion is on the filter portion.

17. A blow-by gas filtration assembly which is fluidically connectable to a crankcase ventilation circuit of an internal combustion engine to receive blow-by gases and filter from suspended particles contained in the blow-by gases, wherein the blow-by gas filtration assembly has an axis and comprises:

a filter group which extends along the axis, having a hollow cylindrical shape with a central cavity which is traversable by blow-by gases radially;

a support and control member engageable to the filter group for supporting the filter group in an axial position along the axis and for controlling the filter group in rotation around said axis to perform filtration operations;

wherein the support and control member and the filter group comprise, respectively, a threaded member portion and a threaded filter portion engageable by reciprocal screwing around the axis;

wherein the support and control member and the filter group comprise, respectively, a member abutment and a filter abutment, wherein axial engagement between the member abutment and the filter abutment prevents further screwing of the threaded member portion to a threaded filter portion; and wherein the support and control member comprises a shaft which extends along the axis, inside the central cavity, wherein the shaft comprises a filter portion on which the filter group is mounted and a control portion engageable to a control drive to produce rotatory control action, wherein said threaded member portion is positioned on the shaft.

18. The blow-by gas filtration assembly according to claim 17, wherein the shaft, at least in the filter portion thereof, is hollow and comprises an air duct, wherein the filter group sealingly engages the shaft in two axially distinct sealing regions, wherein the shaft comprises air slits, axially positioned between the two sealing regions, which place the air duct and the central chamber in fluidic communication.

19. The blow-by gas filtration assembly according to claim 17, wherein the shaft comprises a retention element configured to be housed in a retention cavity in the filter group, wherein the retention element housed in the retention cavity obstructs axial movement of the filter group with respect to the shaft.

20. A blow-by gas filtration assembly which is fluidically connectable to a crankcase ventilation circuit of an internal combustion engine to receive blow-by gases and filter from suspended particles contained in the blow-by gases, wherein the blow-by gas filtration assembly has an axis and comprises:

a filter group which extends along the axis, having a hollow cylindrical shape with a central cavity which is traversable by blow-by gases radially;

a support and control member engageable to the filter group for supporting the filter group in an axial position along the axis and for controlling the filter group in rotation around said axis to perform filtration operations;

wherein the support and control member and the filter group comprise, respectively, a threaded member portion and a threaded filter portion engageable by reciprocal screwing around the axis;

wherein the support and control member and the filter group comprise, respectively, a member abutment and a filter abutment, wherein axial engagement between the member abutment and the filter abutment prevents further screwing of the threaded member portion to a threaded filter portion; and wherein engagement between the threaded member portion and the threaded filter portion is sealed.

\* \* \* \* \*